United States Patent

[11] 3,565,258

[72] Inventors Ardis R. Lavender
 North Riverside;
 Finley W. Markley, Naperville, Ill.
[21] Appl. No. 830,969
[22] Filed June 6, 1969
[45] Patented Feb. 23, 1971
[73] Assignee the United States of America as represented by the United States Atomic Energy Commission

[54] PARALLEL FLOW HEMODIALYZER
 3 Claims, 6 Drawing Figs.
[52] U.S. Cl. ................................................. 210/321
[51] Int. Cl. ................................................. B01d 31/00
[50] Field of Search........................................ 210/321; 23/258.5

[56] References Cited
 UNITED STATES PATENTS
 2,664,395  12/1953  Marchand ................... 210/321
 3,228,877  1/1966   Mahon ........ ................ 210/321X
 3,362,540  1/1968   Bluenile, Jr. .................. 210/321

OTHER REFERENCES

Kolff, W. J. " Dialysis Becomes Practical," a publication of C. H. Boehringer Sohn, Ingelheim Am Rhein, pp. 4, 19, 27, 34, 36 and 37 relied on.

Primary Examiner—Frank A. Spear, Jr.
Attorney—Roland A. Anderson

ABSTRACT: A hemodialyzer with semipermeable membrane tubes arranged in parallel. The tubes lead to dialysate manifolds at either ends of the tubes which are sealed from blood manifolds one on each side of the tubes by epoxy resin surrounding each cellophane tube. The tubes are closely packed with dialysate flowing through them and blood flowing around them. Tube supports within the tubes provide flow paths for both the dialysate and the blood while flaps on the outside of each tube prevent peel stress due to blood flow from destroying the epoxy bonds.

PATENTED FEB 23 1971  3,565,258

Inventors
Ardis R. Lavender
Finley W. Markley

Attorney

Inventors
Ardis R. Lavender
Finley W. Markley

Attorney

PARALLEL FLOW HEMODIALYZER

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to an apparatus and method for extracorporeal hemodialysis and more particularly to hemodialysis with a small disposable unit usable in the home.

Hemodialysis is a proven and life saving therapy for people with chronic renal failure. At the present time, hemodialysis is costly, time-consuming and complex. Hemodialysis for each patient usually costs from $10,000 to $25,000 per year and requires skilled medical and technical personnel and also occupies valuable hospital bed space. It has been estimated that an annual increment of 50,000 people each year would benefit from hemodialysis therapy if it were economically and technically feasible, but at the present time, only about 900 persons are receiving treatment in the United States.

A common type of machine used for hemodialysis consists of a tightly wound cellophane tube submerged in a dialysate. Blood containing various amino impurities such as urea and creatinine as well as excessive amounts of sodium chloride and other salts passes through the cellophane tube. Since the concentration of the various impurities in the blood is greater than the concentration of the impurities in the dialysate, a concentration gradient is established across the cellophane. The cellophane acts as a semipermeable membrane through which the impurities may pass but not the blood. Since the cellophane tube is long and tightly wound, a blood pump is required to force blood through the tube. The blood in the tube is under greater pressure than the dialysate so a pressure gradient in addition to the aforementioned concentration gradient exists across the cellophane tube. The pressure gradient is a driving force which forces water from the blood into the dialysate. The blood is at greater pressure than the dialysate for two reasons: first, transfer of water from the blood is a renal function; and second, the greater pressure of the blood prevents contamination of the blood by dialysate if there is a leak in the tube.

The machine has several disadvantages with respect to home use. Because the pressure drop from one end to the other of the cellophane tube is long, a blood pump is necessary to force blood through the tube. Blood clots may result from use of the pump and care must be taken to prevent their formation. In addition, the blood inventory in the cellophane tube is substantial and a transfusion often is required when the machine is used. Only part of this blood can be recovered from the machine and since blood is expensive, this represents a significant cost in hemodialysis. It is clear that the machinery necessary for hemodialysis is not only complicated and expensive, but the required transfusions and blood pump prevent its use by anyone other than trained medical personnel. All these factors in addition to the limited amount of available hospital space result in people dying every year because hemodialysis is not available to them.

The dialyzer of this invention is related to that described in copending application Ser. No. 722,445. The applicants for both inventions are the same, and the inventions are related in that both concern dialyzers which make use of a plurality of short parallel semipermeable membrane tubes. In both inventions, the blood is under greater pressure than the dialysate in order to ensure that water transfer as well as impurity transfer occurs. In the first filed invention, great care was required to prevent the blood from contacting sharp surfaces and to that end, considerable detail was devoted to providing rounded surfaces at the blood inlet. Steps included in providing rounded surfaces were the introduction of inserts into the cellophane tubes, two different potting steps and shims to reduce the volume of blood not in contact with the cellophane tubes. The present invention obviates the necessity for the intricate manufacturing steps required in the prior invention by reversing the flow paths of the dialysate and the blood so that the dialysate flows inside the tubes while blood flows across the tubes. The reversal of the dialysate and blood flow paths in the present invention gives rise to a significant simplification of the manufacturing procedures required for the device, as will be explained.

It is the principal object of this invention to provide a small disposable hemodialyzer which may be used for the purification of blood by nonmedically trained personnel.

DETAILED DESCRIPTION OF THE PREFERRED EMBODIMENT

Figure 1:
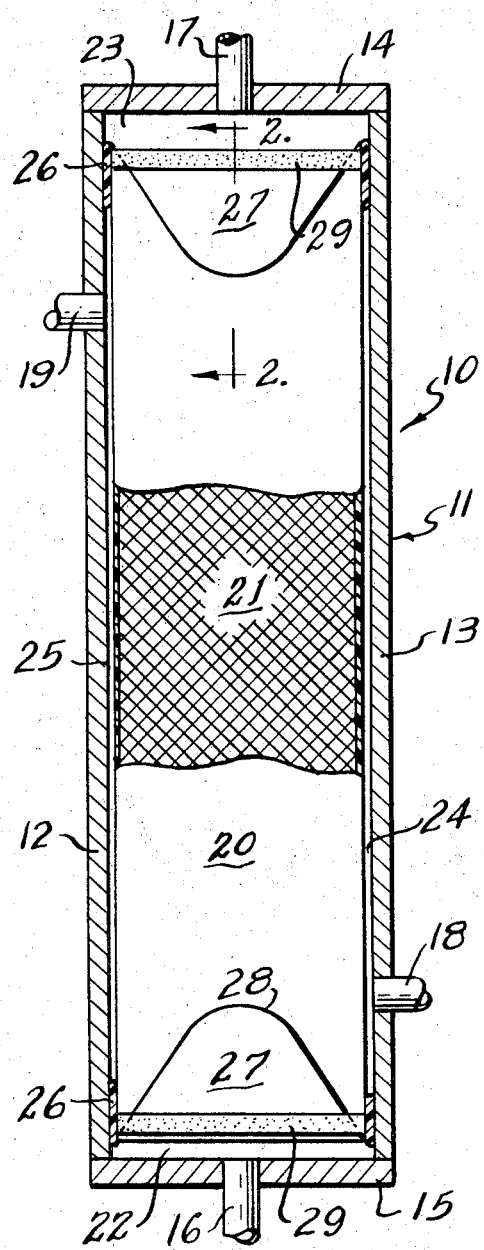
FIG. 1 is a longitudinal section of a device according to the invention.

With reference to FIG. 1, dialyzer 10 is comprised of a rectangular housing 11 including parallel sides 12 and 13 and ends 14 and 15. Connected to housing 11 through end 15 is a dialysate inlet 16 and through end 14 a dialysate outlet 17. Also connected to the housing through side 13 is a blood inlet 18 and through side 12 is a blood outlet 19. A plurality of semipermeable membranes in the form of elongated, flat cellophane tubes 20, each containing a nonwoven plastic mesh support 21, are disposed in parallel relationship within housing 11. Cellophane tubes 20 are slightly smaller than is housing 11 thereby providing room for a dialysate inlet manifold 22 with which dialysate inlet 16 communicates, a dialysate outlet manifold 23 with which dialysate outlet 17 communicates, a blood inlet manifold 24 with which blood inlet 18 communicates and a blood outlet manifold 25 with which blood outlet 19 communicates. A layer 26 of epoxy resin between the housing and the cellophane tubes on each side of the housing at the top and bottom thereof seal the inlet manifolds from the outlet manifolds and create a blood chamber between the dialysate inlet and outlet.

Figure 2:
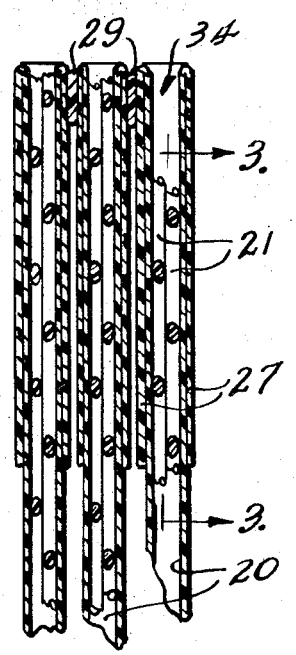
FIG. 2 is a partial section taken along line 2–2 of FIG. 1.

With reference also to FIG. 2 it is seen that each cellophane tube 20 has at each end and on each side of the tube, foldedback flaps 27 which have a tapered and rounded edge 28, the purpose of which will be later explained. Any epoxy resin bead 29 seals each and every flap 27 to the flap of the next cellophane tube 20. The epoxy resin bead 29 is placed at a point on flap 27 to ensure a complete seal across the width of tubes 20.

Figure 3:
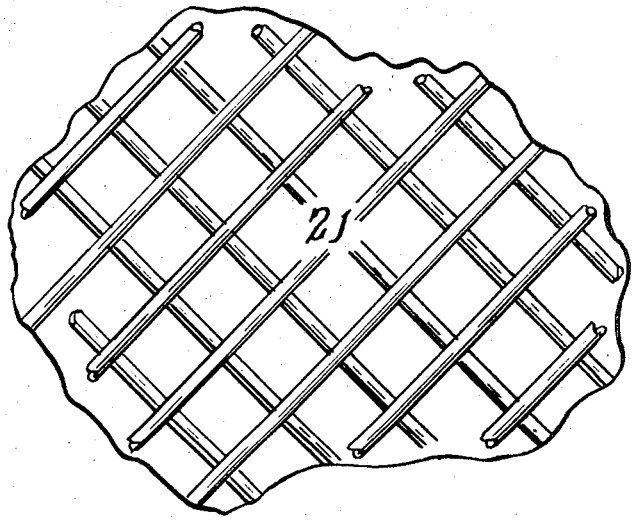
FIG. 3 is a partial section taken along line 3–3 of FIG. 2.

FIG. 3 shows in more detail the character of nonwoven mesh support 21 which is preferably as thin as possible. The mesh support 21 must be nonwoven in order to provide paths for blood flow resulting from deformation of the cellophane tubes 20 into the interstices of the mesh due to the pressure gradient between the blood and dialysate.

Figure 6:
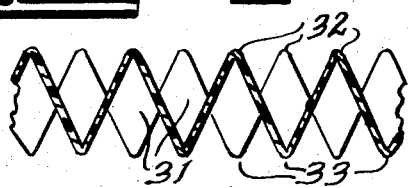
FIG. 6 is a section of a species of support members.

FIG. 6 shows an alternate form of mesh support 21. The support consists of a thin plastic sheet formed into alternately inverted hollow pyramids or cones 31 arranged so that an upward pointing pyramid 32 is surrounded on four sides by downward pointing pyramids 33. These support members are also described in the aforementioned related application.

In operation, blood enters blood inlet 18 and flows into blood inlet manifold 24. The blood flows across cellophane tubes 20 into blood outlet manifold 25 and thereafter out of dialyzer 10 through blood outlet 19. The dialysate enters dialysate inlet 16 and flows from dialysate inlet manifold 22 through cellophane tubes 20 to dialysate outlet manifold 23 and out of the dialyzer 10 through dialysate outlet 17. Although the flow paths of both the blood and the dialysate have been reversed from those shown in out application Ser. No. 722,445, it will be shown, with data hereinafter reported, that the pressure drop between the blood inlet 18 and the blood outlet 19 remains negligible and the blood-priming volume or inventory is in fact smaller than the related invention hereinbefore mentioned. Since the blood inventory in the dialyzer is small and the pressure drop between the blood inlet 18 and the blood outlet 19 is negligible, neither transfusions nor blood pumps are required.

Figure 4:
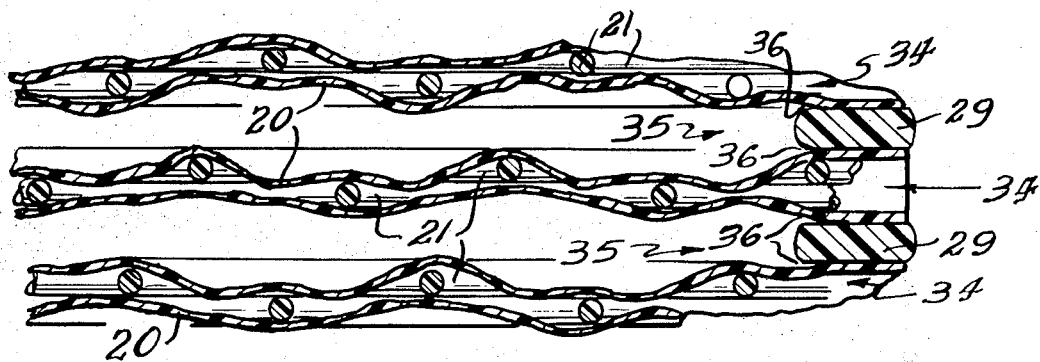
FIGS. 4 and 5 are enlarged views of different embodiments of the invention.
Figure 5:
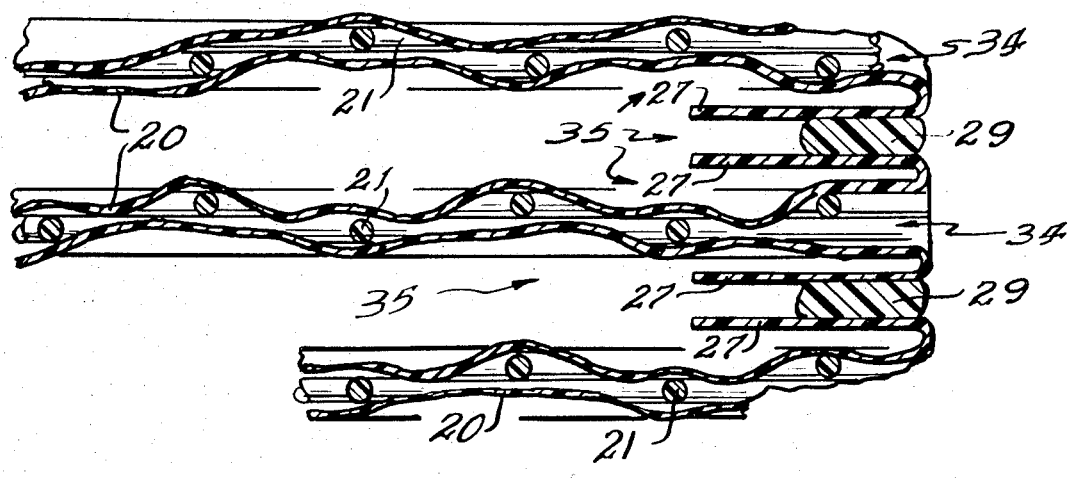

Since the blood is at higher pressure than dialysate in order to drive water from the blood to the dialysate, the cellophane tubes 20 deform around mesh supports 21 as shown in FIGS. 4 and 5. It is this deformation of tubes 20 into mesh 21 that provides a path for the blood to flow since the assembly of tubes is compressed until the distance between the tubes is theoretically zero. Additionally, the absence of inserts in the tubes a s required in our first filed invention obviates the necessity of shims to increase the amount of blood in contact with tubes 20. In FIG. 4 cellophane tubes 20 are bonded to each other at either end by epoxy resin bead 29 without the use of flaps 27. Dialysate flow is represented by arrows 34 while blood flow is either into or out of the paper. There is, however, pressure exerted by the blood in the direction of arrows 35. Because cellophane tubes 20 are deformed at the juncture 36 of the tube and the epoxy resin bead 29 due to the pressure gradient between the dialysate and the blood, the blood will exert a peel stress against the tube at the juncture which causes the tube to peal away from the bead and result in failure of the seal. This peel stress is principally caused because of the difference in pressure between the blood and the dialysate at juncture 3. Referring now to FIG. 5 which shows the preferred embodiment, if nonwoven mesh supports 21 are employed inside cellophane tubes 20, it is seen that folded-back flaps 27 are bonded to each other by epoxy resin bead 29 so that there is no pressure gradient across the cellophane tube at the juncture 37 of the epoxy bead and the flaps because blood is present on both sides of the flap; the absence of the pressure gradient results in no appreciable peel stress on the epoxy resin bead. Friction between the flap and its adjacent tubes prevents motion of the epoxy bead 29 under influence of the blood pressure and therefore, peel stresses on the opposite side of the epoxy cellophane juncture are also prevented. The use of flaps 27 result in a seal which is permanent within the testing experience of this device while devices prepared with mesh supports 21 but without flaps 27 have failed within an hour and a half of the start of tests.

It is contemplated that flaps 27 will not be needed if the alternate support member 30 is used since pyramids 31 are so close together that significant peel stresses should not develop between the epoxy resin bead 29 and tube 20 because the deformation at the juncture of the tube and the bead should be slight.

Several devices using 20 mil. thick mesh supports 21 have been extensively tested both in vitro and in dogs. While mesh supports 60 mils thick are operable, the thinner the mesh the greater number of tubes per volume can be assembled. The in vitro experiments were conducted with artificial blood solutions containing known quantities of impurities such as urea, creatinine, sodium chloride and other salts. In all experiments the blood flow rate and the dialysate flow rate were recorded in milliliter per minute. Blood samples were taken, analyzed and the dialysance of various impurities calculated. Dialysance in milliliter per minute is defined as $$\frac{A-V}{A-D} \times \text{blood flow rate}$$

where:
A = concentration of impurity in blood entering dialyzer;
V = concentration of impurity in blood leaving dialyzer; and
D = concentration of impurity in dialysate entering dialyzer.

All experiments were conducted at room temperature and except for the experiments with dogs, the blood flows and dialysate flows were adjusted with constant flow pumps. The data obtained from these experiments are presented in the following experiments:

EXPERIMENT I

Pressure drop at 600 ml./min. = 1 mm. Hg.
Priming volume = 50 ml.
Surface area = 0.648 square meter.
80 tubes; 9 cm. length x 4.5 cm. width.

In Vitro—Saline Solutions

| BF (a) (ml./min.) | DF (b) (ml./min.) | Dialysance (ml./min.) | | | |
|---|---|---|---|---|---|
| | | Urea | Creatinine | Na | K |
| 132 | 148 | 37 | 30 | 42 | 48 |
| 132 | 348 | 43 | 32 | 44 | 52 |
| 132 | 540 | 50 | 33 | 52 | 63 |
| 132 | 648 | 52 | 37 | 44 | 58 |
| 132 | 810 | 53 | 38 | 50 | 68 |
| 288 | 144 | 51 | 37 | 46 | 56 |
| 288 | 360 | 60 | 40 | 63 | 83 |
| 288 | 600 | 66 | 43 | 67 | 87 |
| 288 | 720 | 59 | 43 | 62 | 79 |
| 288 | 870 | 68 | 43 | 73 | 88 |
| 288 | 870 | 73 | 46 | 63 | 70 |
| 444 | 136 | 36 | 40 | 66 | 69 |
| 444 | 360 | 68 | 44 | 62 | 80 |
| 444 | 582 | 58 | 40 | 76 | 90 |
| 444 | 780 | 69 | 44 | 75 | 95 |
| 444 | 900 | 87 | 49 | 67 | 90 |
| 444 | 936 | 82 | 49 | 82 | 100 |
| 600 | 936 | 85 | 61 | 84 | 97 |
| 600 | 708 | 80 | 60 | 68 | 102 |
| 600 | 552 | 71 | 54 | 77 | 89 |
| 600 | 352 | 73 | 54 | 74 | 81 |
| 600 | 144 | 63 | 42 | 54 | 72 |

| | | Dog | | | |
|---|---|---|---|---|---|
| 144 | 84 | | | 32 | |
| 144 | 324 | | | 39 | |
| 144 | 438 | | | 32 | |
| 144 | 612 | | | 39 | |
| 144 | 720 | | | 32 | |
| 276 | 84 | | | 33 | |
| 276 | 372 | | | 47 | |
| 276 | 510 | | | 50 | |
| 276 | 648 | | | 33 | |
| 276 | 720 | | | 52 | |
| 450 | 84 | | | 55 | |
| 450 | 360 | | | 27 | |
| 450 | 528 | | | 50 | |
| 450 | 750 | | | 68 | |
| 450 | 936 | | | 59 | |

(a) BF = Blood flow.   (b) DF = Dialysate flow.

EXPERIMENT II

Pressure drop at 600 ml./min. = 4 mm. Hg.
Priming volume = 15 ml.
Surface area = 0.5558 square meter.
65 tubes; 9 cm. length x 4.5 cm. width.

In Vitro—Saline Solutions

| BF (a) (ml./min.) | DF (b) (ml./min.) | Dialysance (ml./min.) | | | |
|---|---|---|---|---|---|
| | | Urea | Creatinine | Na | K |
| 138 | 128 | 32 | 22 | 32 | 37 |
| 138 | 288 | 35 | 25 | 33 | 44 |
| 138 | 408 | 40 | 21 | 35 | 47 |
| 138 | 510 | 40 | 24 | 39 | 48 |
| 138 | 672 | 41 | 26 | 39 | 51 |
| 280 | 144 | 34 | 24 | 40 | 42 |
| 280 | 306 | 43 | 24 | 36 | 55 |
| 280 | 480 | 40 | 28 | 48 | 53 |
| 280 | 570 | 44 | 26 | 45 | 55 |
| 280 | 672 | 53 | 31 | 43 | 57 |
| 444 | 136 | 33 | 18 | 39 | 54 |
| 444 | 348 | 39 | 19 | 44 | 54 |
| 444 | 546 | 39 | 22 | 53 | 67 |
| 444 | 664 | 44 | 26 | 49 | 68 |
| 444 | 756 | 52 | 27 | 54 | 68 |
| 600 | 144 | 53 | 23 | 51 | 54 |
| 600 | 304 | 69 | 23 | 52 | 67 |
| 600 | 450 | 59 | 38 | 47 | 61 |
| 600 | 558 | 60 | 37 | 51 | 71 |
| 600 | 756 | 57 | 46 | 60 | 65 |

| | | Dog | | | |
|---|---|---|---|---|---|
| 138 | 112 | | | 17 | |
| 138 | 256 | | | 18 | |
| 138 | 378 | | | 19 | |
| 138 | 488 | | | 19 | |
| 138 | 615 | | | 19 | |
| 280 | 112 | | | 24 | |
| 280 | 252 | | | 32 | |
| 280 | 354 | | | 41 | |
| 280 | 492 | | | 42 | |
| 280 | 504 | | | 52 | |
| 444 | 204 | | | 20 | |
| 444 | 312 | | | 32 | |
| 444 | 368 | | | 38 | |
| 444 | 504 | | | 55 | |

(a) BF = Blood flow.   (b) DF = Dialysate flow.

EXPERIMENT III

Pressure drop at 612 ml./min.=12 mm Hg
Priming volume=9 ml.
Surface area=0.54 square meter
80 tubes; 7.5 cm. length x 4.5 cm. width In Vitro—Saline Solutions

| BF (a) (ml./min.) | DF (b) (ml./min.) | Dialysance (ml./min.) | | | |
|---|---|---|---|---|---|
| | | Urea | Creatinine | Na | K |
| 144 | 132 | 47 | 46 | 32 | 41 |
| 144 | 300 | 55 | 45 | 32 | 53 |
| 144 | 480 | 61 | 46 | 36 | 57 |
| 144 | 588 | 62 | 48 | 40 | 62 |
| 144 | 672 | 48 | 45 | 44 | 61 |
| 276 | 132 | 49 | 15 | 32 | 51 |
| 276 | 324 | 60 | 62 | 43 | 59 |
| 276 | 468 | 73 | 69 | 54 | 63 |
| 276 | 576 | 78 | 66 | 52 | 65 |
| 276 | 768 | 75 | 64 | 52 | 68 |
| 450 | 132 | 45 | 59 | 38 | 61 |
| 450 | 252 | 43 | 59 | 41 | 68 |
| 450 | 432 | 68 | 59 | 41 | 77 |
| 450 | 636 | 61 | 63 | 43 | 79 |
| 450 | 768 | 60 | 68 | 53 | 84 |
| 450 | 900 | 51 | 51 | 59 | 86 |
| 612 | 132 | 37 | 47 | 64 | 69 |
| 612 | 312 | 61 | 52 | 42 | 71 |
| 612 | 480 | 63 | 57 | 49 | 79 |
| 612 | 624 | 76 | 67 | 62 | 84 |
| 612 | 768 | 78 | 80 | 83 | 88 |

(a) BF=Blood flow.  (b) Dialysate flow.

EXPERIMENT IV

Pressure drop at 624 ml./min.=24 mm. Hg
Priming volume=27 ml.
Surface area=0.6048 square meter In Vitro—Saline Solutions

| BF (a) (ml./min.) | DF (b) (ml./min.) | Dialysance (ml./min.) | | | |
|---|---|---|---|---|---|
| | | Urea | Creatinine | Na | K |
| 144 | 144 | 37 | 21 | 29 | 28 |
| 144 | 228 | 34 | 26 | 32 | 47 |
| 144 | 360 | 38 | 27 | 36 | 50 |
| 144 | 480 | 37 | 32 | 40 | 54 |
| 144 | 660 | 46 | 34 | 41 | 55 |
| 288 | 144 | 39 | 23 | 29 | 40 |
| 288 | 240 | 52 | 25 | 39 | 50 |
| 288 | 336 | 60 | 30 | 42 | 58 |
| 288 | 444 | 58 | 30 | 49 | 56 |
| 288 | 696 | 70 | 32 | 58 | 72 |
| 456 | 144 | 37 | 27 | 32 | 47 |
| 456 | 216 | 61 | 32 | 42 | 53 |
| 456 | 336 | 58 | 34 | 50 | 62 |
| 456 | 492 | 48 | 41 | 51 | 65 |
| 456 | 696 | 60 | 42 | 62 | 48 |
| 624 | 144 | 41 | 24 | 34 | 37 |
| 624 | 234 | 45 | 32 | 64 | 49 |
| 624 | 360 | 46 | 35 | 67 | 57 |
| 624 | 480 | 41 | 41 | 63 | 63 |
| 624 | 612 | 57 | 41 | 63 | 71 |
| 624 | 696 | 44 | 41 | 69 | 77 |

(a) BF=Blood flow.  (b) DF=Dialysate flow.

EXPERIMENT V

Pressure drop at 600 ml./min.=10 mm. Hg
Priming volume=20 ml.

In Vitro—Saline Solutions

| BF (a) (ml./min.) | DF (b) (ml./min.) | Dialysance (ml./min.) | | |
|---|---|---|---|---|
| | | Creatinine | Na | K |
| 138 | 120 | 19 | 30 | 36 |
| 138 | 240 | 25 | 36 | 45 |
| 138 | 396 | 29 | 36 | 53 |
| 138 | 564 | 31 | 41 | 55 |
| 138 | 900 | 35 | 51 | 65 |

EXPERIMENT V—Continued

Pressure drop at 600 ml./min.=10 mm. Hg
Priming volume=20 ml.

In Vitro—Saline Solutions

| BF (a) (ml./min.) | DF (b) (ml./min.) | Dialysance (ml./min.) | | |
|---|---|---|---|---|
| | | Creatinine | Na | K |
| 300 | 120 | 25 | 50 | 56 |
| 300 | 267 | 24 | 50 | 57 |
| 300 | 384 | 29 | 50 | 63 |
| 300 | 540 | 38 | 55 | 70 |
| 300 | 924 | 37 | 56 | 73 |
| 468 | 114 | 25 | 52 | 52 |
| 468 | 234 | 23 | 56 | 55 |
| 468 | 396 | 30 | 52 | 65 |
| 468 | 552 | 41 | 55 | 72 |
| 468 | 924 | 45 | 67 | 84 |
| 600 | 114 | 17 | 39 | 47 |
| 600 | 240 | 19 | 51 | 52 |
| 600 | 384 | 26 | 52 | 65 |
| 600 | 552 | 32 | 59 | 72 |
| 600 | 744 | 34 | 59 | 77 |
| 600 | 888 | 36 | 62 | 84 |

(a) BF=Blood flow.  (b) DF=Dialysate flow.

EXPERIMENT VI

Pressure drop at 618 ml./min.=12 mm. Hg
Priming volume=50 ml.
Surface area=0.75 square meter
64 tubes; 13 cm. length x 4.5 cm. width In Vitro—Saline Solutions

| BF (a) (ml./min.) | DF (b) (ml./min.) | Dialysance (ml./min.) | | |
|---|---|---|---|---|
| | | Creatinine | Na | K |
| 492 | 144 | 40 | 46 | 50 |
| 492 | 300 | 42 | 81 | 84 |
| 492 | 480 | 48 | 65 | 89 |
| 492 | 660 | 45 | 79 | 99 |
| 492 | 840 | 43 | 76 | 98 |
| 492 | 960 | 52 | 73 | 97 |
| 618 | 144 | 49 | 59 | 64 |
| 618 | 300 | 39 | 70 | 84 |
| 618 | 456 | 53 | 72 | 85 |
| 618 | 600 | 42 | 75 | 84 |
| 618 | 792 | 52 | 83 | 97 |
| 618 | 912 | 35 | 67 | 87 |

(a) BF=Blood flow.  (b) DF=Dialysate flow.

We claim:

1. A hemodialyzer comprising a housing having at one end a dialysate inlet leading to a dialysate inlet manifold and at the other end a dialysate outlet leading from a dialysate outlet manifold; a blood chamber having a blood inlet manifold and a blood outlet manifold between said dialysate inlet and outlet, said blood chamber being sealed from said dialysate inlet manifold and outlet manifold; a plurality of semipermeable membranes in the form of parallel tubes extending through the blood chamber and sealingly connecting the dialysate inlet manifold and outlet manifold; said tubes having on both sides and on each end folded-back flaps, said flaps being generally curved at one end and forming an opening at the other end for dialysate flow, the greater dimension of said opening being essentially normal to the longitudinal axis of the cellophane tube; and a blood inlet and outlet connected to the respective blood inlet and blood outlet manifolds.

The embodiments of the invention in which an exclusive property or privilege is claimed are defined as follows:

2. The dialyzer of claim 1 wherein the tubes are sealed to each other with epoxy resin on the flaps at a point near the tube openings.

3. The dialyzer of claim 1 wherein the tubes are cellophane and have a wall thickness of about 1 mil.